United States Patent [19]
Zieba et al.

[11] Patent Number: 5,811,923
[45] Date of Patent: Sep. 22, 1998

[54] PLASMA DISPLAY PANEL WITH INFRARED ABSORBING COATING

[75] Inventors: Jaroslaw Zieba, Santa Rosa, Calif.; James W. Seeser, Columbia, Mo.; Michael Cumbo, Santa Rosa, Calif.; William T. Beauchamp, Santa Rosa, Calif.; Robert Scanlon, Santa Rosa, Calif.; Curtis Hruska, Santa Rosa, Calif.

[73] Assignee: Optical Coating Laboratory, Inc., Santa Rosa, Calif.

[21] Appl. No.: 774,058

[22] Filed: Dec. 23, 1996

[51] Int. Cl.$^6$ .............................. H01J 17/04; H01J 17/49
[52] U.S. Cl. ........................ 313/479; 313/478; 313/446; 313/112; 313/635; 348/819; 348/835; 174/35 MS; 315/85
[58] Field of Search ..................................... 313/466, 478, 313/479, 313, 112, 116, 635; 348/819, 834, 835; 174/35 MS, 35 R; 315/85

[56] References Cited

U.S. PATENT DOCUMENTS

| | | | |
|---|---|---|---|
| 3,873,868 | 3/1975 | Robinder | 313/112 |
| 4,293,732 | 10/1981 | Rancourt et al. | 136/257 |
| 4,839,736 | 6/1989 | Sugihara et al. | 348/835 |
| 4,910,090 | 3/1990 | Kuhlman et al. | 174/35 MS |
| 5,004,490 | 4/1991 | Brown | 60/60.52 |
| 5,147,694 | 9/1992 | Clarke | 174/35 MS |
| 5,325,579 | 7/1994 | Baier | 29/462 |

OTHER PUBLICATIONS

Weber, Digital Devices, Section 77.4, *Plasma Displays* pp. 1786–1798, 1993 (no month).
Kodak Photographic Filters Handbook, Eastman Kodak Company, pp. 125, 134, 1990 (no month).
Rosco Laboratories Inc., Spectral Graphs for Filter Nos. 821, 874, Sep. 22, 1997.
Product Literature for Monolithic LoE Coating Products, Cardinal IG, Aug. 1993.

*Primary Examiner*—Sandra L. O'Shea
*Assistant Examiner*—Michael Day
*Attorney, Agent, or Firm*—Workman, Nydegger & Seeley

[57] ABSTRACT

The present invention is directed to methods and apparatus for enhancing the performance of visual display units which utilize plasma display panels. More specifically, the present invention provides methods and apparatus for providing an optically enhancing/noise suppressing device for positioning in front of the viewing surface of a plasma display panel. The device also increases the impact resistance of the PDP. The device of the present invention is manufactured separately from the PDP. The device may be provided with attachment means for securing the device to the surface of the visual display unit in a position in front of the viewing surface of the PDP or may be designed to be free-hanging, i.e., suspended, or otherwise positioned in front of the viewing surface of the PDP. In its most basic embodiment, the device of the present invention comprises multiple layers of different materials including at least one plastic substrate layer for impact resistance, an optically selective coating providing high photopic transmittance, continuous high electrical conductivity for RFI shielding, and reflectivity specifically within the near-IR region, and an IR absorbing coating for absorbing IR energy emissions. In a preferred embodiment, the IR absorbing coating constitutes a dye material which is preferably selected to also be color-correcting with respect to the particular PDP.

20 Claims, 3 Drawing Sheets

PLASMA DISPLAY PANEL WITH INFRARED ABSORBING COATING

BACKGROUND OF THE INVENTION

1. The Field of the Invention

The present invention is directed to methods and apparatus for enhancing the performance of visual display units which utilize plasma display panels. More specifically, the present invention provides methods and apparatus for providing an optically enhancing/noise suppressing device for positioning in front of the viewing surface of a plasma display panel. The device also increases the impact resistance of the PDP.

2. The Relevant Technology

Many types of visual display units (VDUs) are known. A very useful type of flat panel display for VDUs utilizes a plasma display panel (PDP) to generate the visual image. PDPs consist of individual cells at the intersection of typically orthogonal electrically communicating address lines. The individual cells electrically communicate with a gas plasma. In a typical PDP, the conducting electrodes are patterned onto opposed surfaces of a front and a rear substrate material. The address electrodes are typically patterned onto the front-facing surface of the rear substrate material and the sustain and bus electrodes are patterned onto the opposed, i.e., rear-facing, surface of the front substrate material. The substrate material is usually glass. Phosphor material(s), similar to that used in fluorescent lamps, are deposited onto the electrode-patterned, front-facing surface of the rear substrate. The phosphor materials can be individually chosen such that they emit only red, green, or blue light thus providing the ability to produce a colored image. Electrically isolating separators are positioned between the different phosphor materials to form separate phosphor channels. The gas plasma is contained between the phosphor materials deposited on the rear substrate and the opposed surface of the front substrate. In this configuration, when a sustaining voltage is applied to pairs of the sustain electrodes, the fringing fields from these electrodes reach into the gas plasma and create a discharge resulting in the emission of ultraviolet (UV) light from the gas plasma. The UV emission, in turn, excites the adjacent phosphor material resulting in emission of visible light which is transmitted through the electrode-patterned front substrate and, thus, to the eye of the VDU user.

A problem with PDPs is low luminous efficiency, a measure of the display output light luminance for a given input power. Although typical fluorescent lamps emit about 80 lumens of light for every watt of electrical power supplied, current PDPs emit only about 1–4 lumens per watt. In order to achieve sufficient brightness, relatively high power input is necessary. The high power input, however, results in the emission of significant electrical noise including, specifically, radio frequency interference (RFI) due to the plasma discharges and significant infrared (IR) energy due to the plasma discharges and the heat generated within the panel. The RFI and IR emissions may cause interference with other electronic equipment in the near vicinity of the PDP. In particular, the IR radiation can interfere with remote control devices which typically operate at wavelengths in the near-IR range of about 830 to about 880 nm. Thus, there is a need to reduce the emission of radio noise and IR energy from PDPs.

It would be an advance to provide methods and apparatus for suppress the electrical noise emissions, specifically RFI and near-infrared radiation, from PDPs.

SUMMARY AND OBJECTS OF THE INVENTION

It is an object of the present invention to provide methods and apparatus for enhancing the performance of visual display units (VDUs) which utilize plasma display panels (PDPs).

It is a further object of the present invention to provide methods and apparatus for suppressing the electrical noise emissions and, specifically, radio frequency interference (RFI), from PDPs.

Another object of the present invention is to provide methods and apparatus for suppressing electrical noise in form of emissions of infrared (IR) energy and, in particular, near-IR energy, from PDPs.

Yet another object of the present invention is to provide methods and apparatus for suppressing the electrical noise emissions, both RFI and IR energy, while maintaining good transmissivity and readability of the display image.

An additional object of the present invention is to provide methods and apparatus for increasing the impact resistance of PDPs.

These and other objects and features of the present invention will become more fully apparent from the following description and appended claims, or may be learned by the practice of the invention as set forth hereinafter.

In accord with the present invention, it has been discovered that a device for positioning in front of the viewing surface of a plasma display panel can provide an optical enhancement and electrical noise suppression. The device also increases the impact resistance of the PDP. The device of the present invention is manufactured separately from the PDP. The device may be provided with attachment means for securing the device to the surface of the visual display unit in a position in front of the viewing surface of the PDP or may be designed to be free-hanging, i.e., suspended, or otherwise positioned in front of the viewing surface of the PDP.

In its most basic embodiment, the device of the present invention comprises multiple layers of different materials including at least one plastic substrate layer for impact resistance, an optically selective coating providing high photopic transmittance, continuous high electrical conductivity for RFI shielding, and reflectivity specifically within the near-IR region, and an IR absorbing coating for absorbing IR energy emissions.

As used herein, the term "coating" refers to one or more layers of different materials deposited on, or incorporated within, a substrate or a substrate already having one or more coatings deposited thereon or incorporated therein. A coating performs a specific function within the multilayered device design. For example, the IR absorbing coating absorbs IR energy incident thereon. The IR absorbing coating may constitute a dye material incorporated into the plastic substrate layer or, alternatively or additionally, a dye material incorporated into another coating or substrate layer within the device design, such as an adhesive layer used to laminate together two substrate layers within the device design. Alternatively, the IR absorbing coating may constitute one or more layers of different materials deposited onto either an uncoated or a coated surface of a substrate to absorb IR energy incident thereon. Similarly, the optically selective coating provides high photopic transmittance, continuous high electrical conductivity for RFI shielding, and reflectivity specifically within the near-IR region. This coating may be deposited onto a coated or uncoated surface of the plastic substrate layer or onto a coated or uncoated surface of a second substrate layer, if present, within the device.

In a preferred embodiment, the IR absorbing coating constitutes a dye material which is preferably selected to also be color-correcting with respect to the particular PDP. The device of the present invention preferably also incorporates at least one antireflective coating to reduce reflectance from surfaces within the device. It is also preferred to deposit an electrically conducting coating layer, which may or may not also constitute an antireflective coating layer, onto the front viewing surface of the device to provide means for static discharge.

BRIEF DESCRIPTION OF THE DRAWINGS

In order that the manner in which the above-recited and other advantages and objects of the invention are obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

Figure 1:
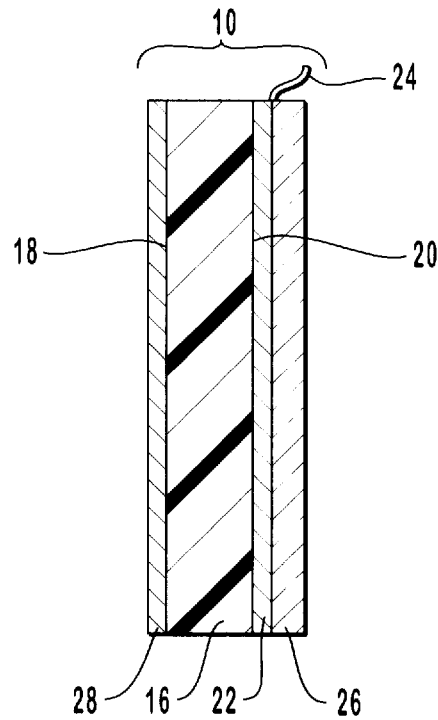
FIG. 1 is a cross-section view of a preferred embodiment of a device for positioning in front of the viewing surface of a plasma display panel in accord with the present invention.

A very useful type of flat panel display for visual display units is a plasma display panel (PDP). PDPs utilize electrical signals to induce the emission of ultraviolet (UV) energy from a gas plasma. The UV emission, in turn, induces the emission of visible light from phosphor materials located within the panel. A problem with PDPs is low luminous efficiency, a measure of the display output light luminance for a given input power. In order to achieve sufficient display brightness, relatively high power input is necessary. Because of the low luminous efficiency, the power input must remain relatively high to maintain a readable display image. Currently available PDPs are typically operated at essentially the highest practical power input.

Plasma discharges within the PDP, particularly at the required high power input, result in the emission of significant electrical noise in the form of radio frequency interference (RFI). The plasma discharges also result in emission of significant infrared (IR) energy from PDPs. As used herein, the term "electrical noise" or "noise" is used inclusively to refer to, in general, either or both RFI and IR emissions from PDPs. The RFI and IR radiation can interfere with other electronic equipment in the vicinity of the PDP. In particular, the near-IR radiation interferes with remote control devices which typically operate at wavelengths in the range of about 830 to about 880 nm.

In view of the above, there is a need to reduce the emission of RFI from PDPs. There is a further need to reduce the emission of IR energy from PDPs and, in particular, to block near-IR radiation in about the 830–880 wavelength range. In accord with the present invention, it has been discovered that a device for positioning in front of the viewing surface of a plasma display panel can be provided to suppress the emission of noise from PDPs and, in particularly, to block RFI and IR emissions. The device of the present invention is manufactured separately from the PDP. The device may be provided with attachment means for securing the device to the surface of the visual display unit in a position in front of the viewing surface of the PDP or may be designed as a free-hanging device for suspending or otherwise positioning in front of the viewing surface of the PDP.

PDPs are inherently fragile and can be easily damaged or broken. Because PDPs are vacuum-based, implosion of the panel is also possible. Such damage or breakage poses a potential hazard to users and also necessitates expensive repair and/or replacement of the PDP. In addition to decreasing emissions of RFI and IR energy, the device of the present invention advantageously increases the impact resistance of the underlying PDP.

In its most basic embodiment, the device of the present invention comprises multiple layers of different materials including at least one plastic substrate layer for impact resistance, an IR absorbing coating for absorbing IR energy emissions, and an optically selective coating for providing high photopic transmittance, continuous high electrical conductivity (for RFI shielding), and high reflectivity specifically within the near-IR region. The plastic substrate layer provides impact resistance to the device and, thus, to the underlying PDP. The IR absorbing coating reduces the emission of IR energy from the PDP. The optically selective coating, when electrically grounded, provides suppression of RFI emissions from the PDP. In addition, the combination of the optically selective coating having high reflectivity specifically in the near-IR region with the IR coating has been discovered to provide excellent IR blocking in the wavelength range of about 830 to about 880 nm.

As used herein, the term "coating" refers to one or more layers of different materials deposited on, or incorporated within, a substrate or a substrate already having one or more coatings deposited thereon or incorporated therein. A coating performs a specific function or functions within the multilayered device design. For example, the IR absorbing coating absorbs IR energy incident thereon. The IR absorbing coating may constitute a dye material incorporated into the plastic substrate layer or, alternatively or additionally, a dye material incorporated into another coating or substrate layer within the device design, such as an adhesive layer used to laminate together two substrate layers within the device design. Alternatively, the IR absorbing coating layer may constitute one or more layers of different materials deposited onto either an uncoated or a coated surface of a substrate to absorb IR energy incident thereon. Similarly, the optically selective coating provides high photopic transmittance, continuous high electrical conductivity for RFI shielding, and high reflectivity specifically within the near-IR region. This coating may be deposited onto a coated or uncoated surface of the plastic substrate layer or onto a coated or uncoated surface of a second substrate layer, if present, within the device.

Exemplary IR absorbing dye materials which can be incorporated into plastic substrate layers and/or polymeric adhesive layers, which are photochemically stable under ambient light conditions, and which absorb light within the near-IR region of the spectrum include the following: 5,5'-dichloro-11-diphenylamino-3,3'-diethyl-10,12-ethylenethiatricarbocyanine perchlorate (which provides peak IR absorption at about 830 nm); 2,4 Di-3-guaiazulenyl-1,3-dihydroxycyclobutenediylium dihydroxide, bis(inner salt) (which provides peak IR absorption about 780 to about 800 nm); and 1-butyl-2-[2-[3[(1-butyl-6-chlorobenz[cd] indol-2(1H)-ylidiene)ethylidene]-2-chloro-5-methyl-1-cyclohexen-1-yl]ethenyl]-6-chlorobenz[cd]indolium tetrafluoroborate (which provides peak IR blocking at about 900 to about 1000 nm).

Examples of polymeric laminating materials suitable for use in the present invention include the following: polyurethane PE-193 or PE-399 available from Morton, International (Arlington Heights, Ill.); polyvinyl butyrate (PVB) available from various manufacturers; and silicone PSA available from Adhesive Research (Glen Rock, Pa.).

PDPs manufactured by different manufacturers comprise different phosphor materials and differing configurations of the components such that the spectral properties of the PDPs differ somewhat. The use of color filters to compensate for the inherent spectral properties and permit clear and readable color images is well known. In particular, depending on the inherent spectral properties, different PDPs may be enhanced with different colors, i.e., tinges, used as a filter. For example, one manufacturer may desire a device having a purple tinge for color correction while another may desire a blue- or green-tinged device for color correction of their PDP. Color correction can be advantageously incorporated into the device of the present invention. Thus, in a preferred embodiment, the IR absorbing coating constitutes a dye material which is selected to complement the color characteristics of particular PDPs, i.e., to be color correcting, and thus, to enhance the chromaticity of the display.

It will be appreciated that the color-correcting dye and the IR absorbing dye do not necessarily have to be the same dye. Rather, two different dyes could be used in the device of the present invention. It will be appreciated, however, that a single dye which serves both these purposes is more cost-effective. For example, the exemplary IR absorbing dyes described above also provide color correction for certain PDPs as follows: 5,5'-dichloro-11-diphenylamino-3,3'-diethyl-10,12-ethylenethiatricarbocyanine perchlorate provides a clear blue device; 2,4 Di-3-guaiazulenyl-1,3-dihydroxycyclobutenediylium dihydroxide, bis(inner salt) provides a blue-green tinge to the device of the present invention; and 1-butyl-2-[2-[3[(1-butyl-6-chlorobenz[cd] indol-2(1H)-ylidiene)ethylidene]-2-chloro-5-methyl-1-cyclohexen-1-yl]ethenyl]-6-chlorobenz[cd]indolium tetrafluoroborate provides a purple-tinged device.

Because of the plasma discharges, emission of RFI from PDPs may be much greater than from other types of flat panel displays, e.g., cathode ray tube (CRT) displays or liquid crystal displays (LCDs). As described above, the device of the present invention comprises an optically selective coating to provide good photopic transmittance, continuous high electrical conductivity for RFI shielding, and reflectivity specifically within the near-IR region. This coating may be deposited onto a coated or uncoated surface of the plastic substrate layer or onto a coated or uncoated surface of a second substrate layer, if present, within the device. Unlike conventional RFI shielding layers, the optically selective coating of the present invention provides a continuous electrically conducting layer. In particular, rather than being patterned with an electrically conducting material, the entire optically selective layer comprises an electrically conducting material such that the optically selective layer is continuously electrically conducting. The optically selective coating must be electrically grounded to suppress RFI. Thus, the optically selective coating is provided with means for making an electrical connection to a suitable component of the PDP or the visual display unit itself to thereby electrically ground the optically selective coating.

The electrical conductivity of a coating is rarely specified explicitly. Rather, the sheet resistivity is specified, usually in terms of ohms per square, since with this form, it is not necessary to specify the thickness of the coating. The sheet resistivity of a coating varies with the thickness and the intrinsic electrical resistivity of the selected material. The specific relationship is described by the formula $R_s=\rho/t$, where $R_s$ represents sheet resistance in units of ohms per square, $\rho$ is intrinsic resistivity in units of ohm.cm, and t is film thickness. Electrical resistivity is a function of the specific material used as well as the particular deposition method and process conditions employed. Electrical resistivity of semiconductor materials may have a significant temperature coefficient as well.

Sheet resistivity is an inverse measure of conductivity, i.e., the lower the sheet resistivity, the higher the conductivity. Typical sheet resistivity for coatings designed for use with other types of flat panel displays are about 100 ohms per square. For PDPs, however, the coatings require a sheet resistivity of less than about 10 ohms per square and, preferably, less than about 5 ohms per square, to provide the conductivity needed to block the emission of RFI.

In addition to continuous high electrical conductivity and good photopic transmissivity, the optically selective coating of the present invention reflects IR energy and, particularly, near-IR energy. Because PDPs suffer from low luminous efficiency, good photopic transmittance through the viewing surface of the PDP must be maintained to avoid degrading the readability of the display. It has been surprisingly discovered that the device of the present invention achieves excellent suppression of IR emissions and, particularly, of near-IR emissions, with the combination of the IR absorbing coating and the optically selective coating while maintaining good photopic transmittance through the viewing surface of the PDP. With either one or more optically selective coating or one or more IR absorbing coatings, separately, a similar suppression of IR emissions could be obtained only at the cost of significantly increasing absorption in the visible spectrum, i.e., decreasing photopic transmittance.

Suitable optically selective coatings having good photopic transmittance, continuous high electrical conductivity, and near-IR reflectivity are commercially available. For example, coating products known as LoE® and LoE²® are available, precoated onto glass substrates, from Cardinal Glass, (Minnetonka, Minn.). Similar coatings are also available on plastic substrates. The LoE and LoE² coating products include dielectric materials and metallic materials in various alternating layers over a substrate. Examples of suitable dielectric materials include metal oxides such as zinc oxide, titanium dioxide, and the like. Examples of suitable metallic materials include silver, nickel, gold, copper, mixtures thereof, and the like.

Optical performance of visual display units is also affected by reflectance introduced at the interfaces of different materials within the PDP, within the device positioned in front of the PDP, and between the device and the PDP. Reflectance occurs at the interfaces of materials having differing indices of refraction, i.e., where there is an index discontinuity.

For the above reason, the device of the present invention preferably incorporates antireflective coatings to reduce reflectance from interfacing materials within the device. For example, an antireflective coating can be applied to the front viewing surface of the device. Another antireflective coating can be applied to the rear surface, i.e., PDP-facing, surface of the device. It is also preferred to deposit an electrically conducting layer, which may also function as the antireflective coating, on the front viewing surface of the device to provide static discharge. Suitable antireflective coatings and antireflective coatings which are electrically conductive are known in the art. For example, an exemplary antireflective coating is HEA® coating and an exemplary conducting coating is CHEA® coating (both coatings are products of Optical Coating Laboratories, Inc., Santa Rosa, Calif.).

The manufacture of PDPs generally requires that the components be assembled and then subjected to a frit operation to seal the panel. The frit operation includes baking the panel at temperatures of about 500° C. for about 30 minutes. All material and compositions used within the panel must be able to withstand these processing conditions. This requirement limits the available materials and compositions which can be used within a PDP. The device of the present invention advantageously is manufactured separately from the PDP. In addition, because the device is not exposed to the frit operation used to seal the panel, the device provides an additional means to affect the performance of the underlying PDP without the constraint of using only materials and compositions which can tolerate the frit operation. For example, as described above, in a preferred embodiment of the present invention, the IR absorbing coating layer constitutes a dye material which is preferably selected to also be color-correcting with respect to the particular PDP.

As shown in the cross section view of FIG. 1, a preferred embodiment of the present invention provides a device 10 for positioning in front of the viewing surface of a plasma display panel (not shown). It will be appreciated that the materials and compositions comprising the device are not shown to scale or in proportional sizes in the Figures herein. In addition, the use of the terms "first" and "second," etc. to refer to substrate layers is not intended to necessarily indicate position with respect to either the front viewing surface of the device or the rear plasma display panel-facing surface of the device.

The optically enhancing and noise suppressing device 10 for positioning in front of the viewing surface of a PDP comprises a dyed plastic substrate 16 having a front surface 18 and a rear surface 20 for positioning in front of the viewing surface of the plasma display panel. The dyed plastic substrate has an IR absorbing and, preferably, color-correcting, dye material incorporated therein. As described above, a suitable dye may be selected to provide color correction for a particular PDP design. An optically selective coating 22 is deposited on the rear surface 20 of the dyed plastic substrate 16. As described above, the optically selective coating is required to have good photopic transmittance, continuous high electrical conductivity, and reflectivity in the near-IR range. It will be appreciated that the optically selective coating could be deposited on the front surface 18 of the dyed plastic substrate rather than the rear surface. The optically selective coating must be provided with means for electrical grounding. For example, a bus bar (not shown) may be formed on one surface of this layer and provided with an electrical connector 24 by conventional methods. The bus bar may, for example, be formed from electrically conducting copper-based adhesive tape placed in contact with the peripheral edges of the optically selective coating having continuous high electrical conductivity and an extending tape portion may be provided with an electrical connector 24 for making an electrical grounding connection.

An antireflective coating 28 is preferably deposited onto the front surface 18 of the plastic substrate 16. This coating may be electrically conducting and grounded, if desired, to provide means for static discharge on the viewing surface. A second antireflective coating is preferably deposited onto the optically selective coating 22. This coating provides mechanical protection for the optically selective coating as well as reducing reflectance from the device.

Figure 2:
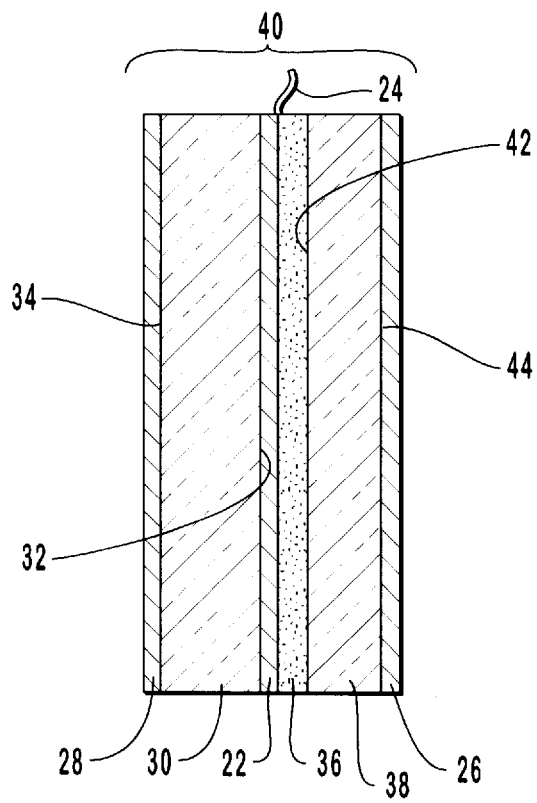
FIG. 2 is a cross-section view of another preferred embodiment of a device for positioning in front of the viewing surface of a plasma display panel in accord with the present invention.

Another preferred embodiment of the present invention is shown in the cross section view of FIG. 2. Reference numbers are repeated from FIG. 1 when designating the same functional layer. The device 40 for positioning in front of the viewing surface of the plasma display panel comprises a first glass substrate 38 having a front surface 42 and a rear surface 44. A second glass substrate 30 has a rear surface 32 which faces the front surface 42 of the first glass substrate 38 and has a front viewing surface 34 which faces outward from the underlying plasma display panel. An optically selective coating 22 is deposited on the rear surface 32 of the second glass substrate 30. As described above, the optically selective coating is required to have good photopic transmittance, continuous high electrical conductivity, and reflectivity in the near-IR range. Second substrate 30 may be provided, for example, in the form of the commercially available LoE²® precoated glass described above.

A plastic substrate 36 is positioned between the two glass substrates and heat is applied such that the plastic substrate and the two glass substrates become laminated together. The plastic substrate 36 has IR absorbing dye, as described above, incorporated therein. In addition, as described above, the selected dye preferably provides color correction for the underlying PDP. It will be appreciated that, in this manner, the plastic substrate serves as an adhesive layer within the device design.

It will be appreciated that the optically selective coating could be deposited on a surface of the plastic substrate or the first glass substrate, if desired. As described above, the optically selective coating must be provided with means for electrical grounding. For example, a bus bar (not shown) may be formed on one surface of this layer and provided with an electrical connector 24 by conventional methods as described above.

An antireflective coating 28 is preferably deposited onto the front surface 34 of the second glass substrate 30. This coating is preferably also provided with means for electrical is grounding (not shown). A second antireflective coating 26 is preferably deposited onto the rear surface 20 (the plasma display panel-facing surface) of the first glass substrate 38.

An advantage of the embodiment shown in FIG. 2 is that the mechanical integrity of the optically selective coating is protected by being sandwiched between two substrate layers.

Figure 3:
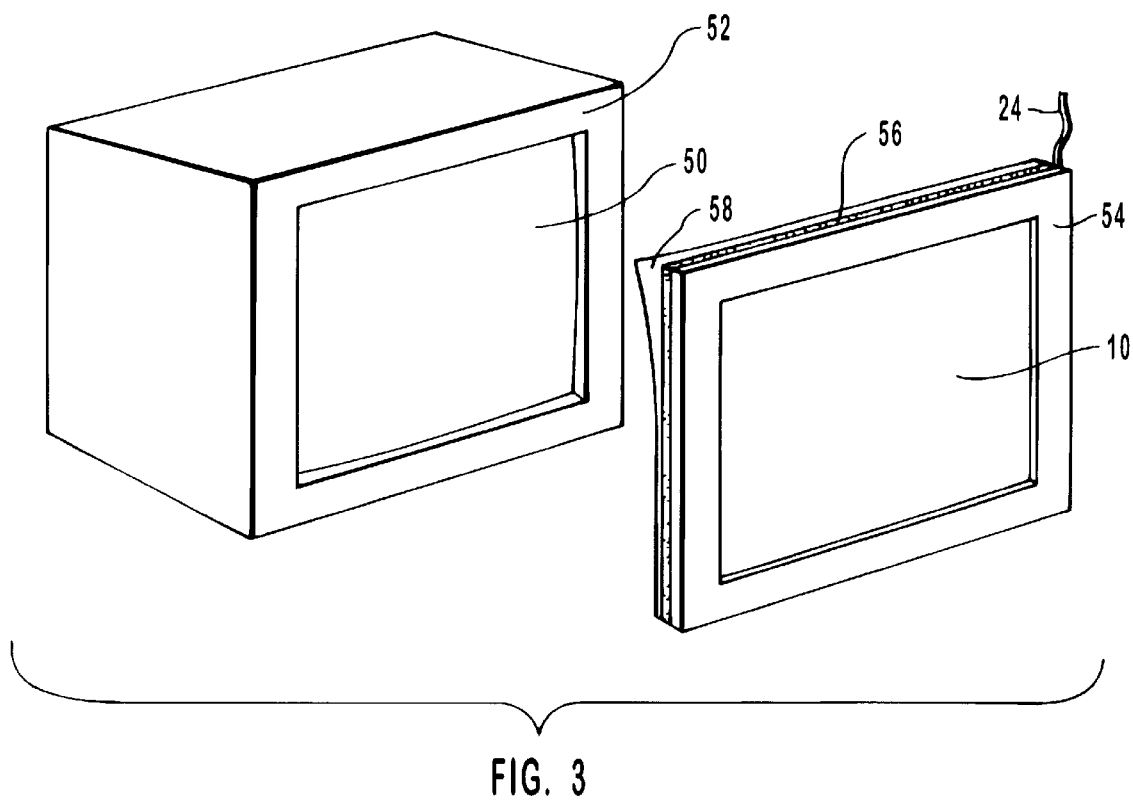
FIG. 3 is a schematic illustration of a preferred embodiment of a device in position to be affixed to the front of a visual display unit in accord with the present invention.

FIG. 3 is a schematic illustration of a device 10 in accord with the present invention ready for positioning in front of the viewing surface of a plasma display panel 50 within a visual display unit 52. As described above, the device of the present invention may be adapted for attaching, either permanently or removably, to the visual display unit or for hanging or otherwise suspending in front of the visual display unit. The device of the present invention preferably comprises a frame element 54 which may, if desired, be made of metal and electrically communicate with the optically selective layer within the device. The optically selective layer is provided with an electrical connector such that the device may be electrically grounded. Depending on the specific design of the visual display unit and the plasma display panel, a suitable connection can be designed for connecting to the electrical connector 24. Various means for securing the device 10 to the front viewing surface of a visual display unit may also preferably be incorporated within the device. For example, as shown in FIG. 3, a pressure-sensitive adhesive layer 56 with a release liner 58 may be applied to the surface of the frame element 54. The release liner may be removed and the frame can be pressed against the visual display unit and secured thereto with the adhesive layer.

Figure 4A:
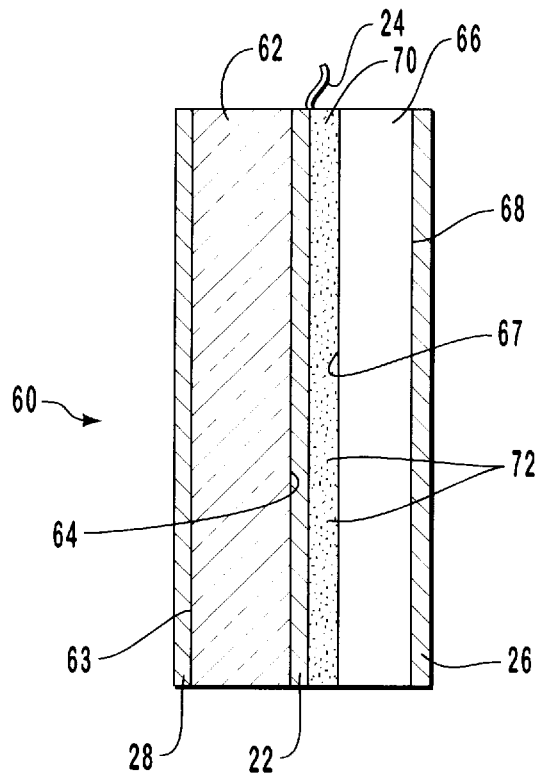
FIG. 4A is a cross-section view of another preferred embodiment of a device for positioning in front of the viewing surface of a plasma display panel in accord with the present invention.
Figure 4B:
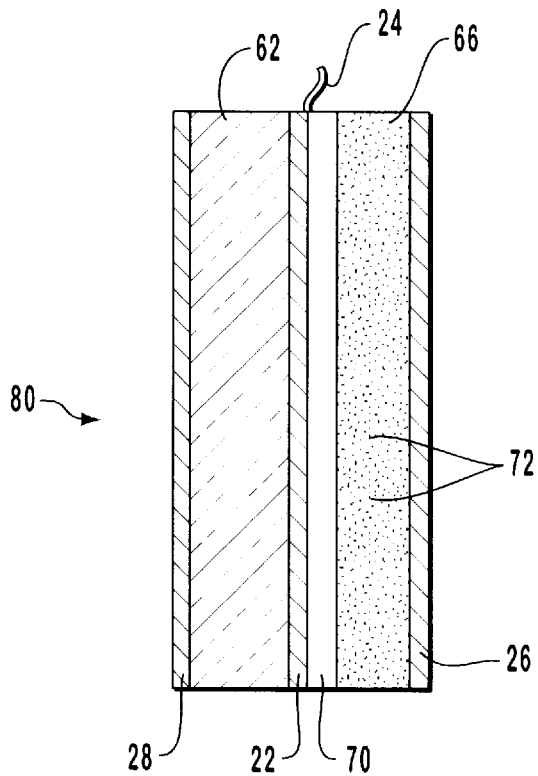
FIG. 4B is a cross-section view of another preferred embodiment of a device for positioning in front of the viewing surface of a plasma display panel in accord with the present invention.

Other preferred embodiments of the present invention are shown in the cross section views of FIGS. 4A and 4B. Reference numbers are repeated from FIG. 1 when designating the same functional layer. A device 60 shown in FIG. 4A for positioning in front of the viewing surface of a plasma display panel includes a glass substrate layer 62 having a front viewing surface 63 and a rear surface 64. A plastic substrate layer 66 has a front surface 67 facing the rear surface 64 of the glass substrate layer 62, and has a rear panel-facing surface 68 for positioning in front of the viewing surface of a plasma display panel (not shown). An optically selective coating 22 is deposited on the rear surface 64 of the glass substrate 62. The optically selective coating 22 is provided with means for electrical grounding. For example, a bus bar (not shown) may be formed on one surface of the optically selective coating 22 and provided with an electrical connector 24.

An adhesive layer 70 is applied between the glass substrate 62 and the plastic substrate 66 such that the two substrates become laminated together. An infrared absorbing coating constituting a dye material 72 is incorporated into the adhesive layer 70. A first antireflective coating 28 is preferably deposited onto the front surface 63 of the glass substrate 62. The antireflective coating 28 is preferably provided with means for electrical grounding (not shown). A second antireflective coating 26 is preferably deposited onto the rear surface 68 of the plastic substrate 66.

A device 80 shown in FIG. 4B for positioning in front of the viewing surface of a plasma display panel has substantially the same components as the device 60 of FIG. 4A Accordingly, the device 70 includes a glass substrate 62 and a plastic substrate 66. An optically selective coating 22 is deposited on the glass substrate 62 and faces the plastic substrate 66. An adhesive layer 70 is disposed between the glass substrate 62 and the plastic substrate 66. The infrared absorbing coating constituting a dye material 72 is, however, incorporated into the plastic substrate layer 66. A first antireflective coating 28 is preferably deposited onto the glass substrate 62, and a second antireflective coating 26 is preferably deposited onto the plastic substrate 66.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. A device for positioning in front of the viewing surface of a plasma display panel, said device comprising:
    a) at least one plastic substrate layer to provide impact resistance to said plasma display panel;
    b) an infrared absorbing coating to absorb infrared energy emitted from said plasma display panel; and
    c) an optically selective coating having photopic transmittance, continuous electrical conductivity and reflectivity within the near-infrared region, said optically selective coating being provided with means for electrically grounding said optically selective coating.

2. The device described in claim 1 wherein said optically selective coating is deposited on a surface of said plastic substrate layer.

3. The device described in claim 2 wherein said infrared absorbing coating is a dye material incorporated into said plastic substrate layer.

4. The device described in claim 3 further comprising an antireflective coating layer deposited on said optically selective coating.

5. The device described in claim 4 further comprising a second antireflective coating layer deposited on a surface of said plastic substrate layer.

6. The device described in claim 5 wherein said second antireflective coating layer is electrically conducting.

7. The device described in claim 3 wherein said dye material is selected from the group consisting of 5,5'-dichloro-11-diphenylamino-3,3'-diethyl-10,12-ethylenethiatricarbocyanine perchlorate; 2,4 Di-3-guaiazulenyl- 1,3-dihydroxycyclobutenediylium dihydroxide,bis(inner salt); and 1-butyl-2-[2-[3[(1-butyl-6-chlorobenz[cd]indol-2(1H)-ylidiene)ethylidene]-2-chloro-5-methyl-1-cyclohexen-1-yl]ethenyl]-6-chlorobenz[cd]indolium tetrafluoroborate.

8. A device for positioning in front of the viewing surface of a plasma display panel, said device comprising:
    a) a first substrate layer;
    b) a second substrate layer positioned parallel and facing said first substrate layer;
    c) a plastic substrate layer between said first substrate layer and said second substrate layer;
    d) an infrared absorbing coating comprising a dye material incorporated into said plastic substrate layer; and
    e) an optically selective coating having photopic transmittance, continuous electrical conductivity and reflectivity within the near-infrared region, said optically selective coating being provided with means for electrically grounding said optically selective coating.

9. The device described in claim 8 wherein said first substrate layer is glass.

10. The device described in claim 9 wherein said second substrate layer is glass.

11. The device described in claim 10 wherein said optically selective coating is deposited on a surface of one of said first glass substrate layer and said second substrate layer, said surface facing an opposing surface of the parallel substrate layer.

12. The device described in claim 11 wherein said dye material comprises a selected color correcting property.

13. The device described in claim 8 wherein said optically selective coating is deposited on a surface of said plastic substrate layer.

14. The device described in claim 8 wherein said dye material is selected from the group consisting of 5,5'-dichloro-11-diphenylamino-3,3'-diethyl-10,12-ethylenethiatricarbocyanine perchlorate; 2,4 Di-3-guaiazulenyl-1,3-dihydroxycyclobutenediylium dihydroxide,bis(inner salt); and 1-butyl-2-[2-[3[(1-butyl-6-chlorobenz[cd]indol-2(1H)-ylidiene)ethylidene]-2-chloro-5-methyl-1-cyclohexen-1-yl]ethenyl]-6-chlorobenz[cd] indolium tetrafluoroborate.

15. A device for positioning in front of the viewing surface of a plasma display panel, said device comprising:

a) a glass substrate layer having a front viewing surface and a rear surface;

b) a plastic substrate layer having a front surface facing said rear surface of said glass substrate and having a rear panel-facing surface for positioning in front of the viewing surface of a plasma display panel;

c) an adhesive layer between said glass substrate layer and said plastic substrate layer;

d) an infrared absorbing coating comprising a dye material incorporated into said adhesive layer; and e) an optically selective coating having photopic transmittance, continuous electrical conductivity and reflectivity within the near-infrared region, said optically selective coating being provided with means for electrically grounding said optically selective coating.

16. The device described in claim 15 further comprising a first antireflective coating layer formed on the glass substrate layer.

17. The device described in claim 16 further comprising a second antireflective coating layer formed on the plastic substrate layer.

18. A device for positioning in front of the viewing surface of a plasma display panel, said device comprising:

a) a glass substrate layer having a front viewing surface and a rear surface;

b) a plastic substrate layer having a front surface facing said rear surface of said glass substrate and having a rear panel-facing surface for positioning in front of the viewing surface of a plasma display panel;

c) an adhesive layer between said glass substrate layer and said plastic substrate layer;

d) an infrared absorbing coating comprising a dye material incorporated into said plastic substrate layer; and e) an optically selective coating having photopic transmittance, continuous electrical conductivity and reflectivity within the near-infrared region, said optically selective coating being provided with means for electrically grounding said optically selective coating.

19. The device described in claim 18 further comprising a first antireflective coating layer formed on the glass substrate layer.

20. The device described in claim 19 further comprising a second antireflective coating layer formed on the plastic substrate layer.

* * * * *